(12) United States Patent
Nakamura

(10) Patent No.: US 9,990,168 B2
(45) Date of Patent: Jun. 5, 2018

(54) RECORDING MEDIUM, INFORMATION PROCESSING APPARATUS, AND INFORMATION PROCESSING METHOD

(71) Applicant: Aoi Nakamura, Kanagawa (JP)

(72) Inventor: Aoi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/428,290

(22) Filed: Feb. 9, 2017

(65) Prior Publication Data

US 2017/0235530 A1    Aug. 17, 2017

(30) Foreign Application Priority Data

Feb. 16, 2016   (JP) ................................. 2016-027112

(51) Int. Cl.
*G06F 3/12*     (2006.01)
*G06K 15/02*    (2006.01)

(52) U.S. Cl.
CPC .......... *G06F 3/1245* (2013.01); *G06F 3/1205* (2013.01); *G06F 3/1211* (2013.01); *G06F 3/1254* (2013.01); *G06F 3/1257* (2013.01); *G06F 3/1267* (2013.01); *G06F 3/1275* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 7,397,572 B1* | 7/2008 | Horii ..................... | H04N 1/407 358/1.13 |
| 2009/0284784 A1* | 11/2009 | Morita ............... | H04N 1/00233 358/1.15 |
| 2009/0290182 A1* | 11/2009 | Hashimoto .......... | G06K 15/005 358/1.9 |
| 2011/0069081 A1* | 3/2011 | Lee ....................... | G06F 3/1438 345/593 |

(Continued)

FOREIGN PATENT DOCUMENTS

JP        2009-160750        7/2009

*Primary Examiner* — Beniyam Menberu
(74) *Attorney, Agent, or Firm* — Harness, Dickey & Pierce, P.L.C.

(57) ABSTRACT

An information processing apparatus includes circuitry that accepts a configured print setting for generating image data, generates identification information for identifying the image data, generates first image data based on a first print setting different from the configured print setting, stores, in a memory, the identification information of the image data and the first image data associated with each other, generates second image data including the identification information of the image data by applying the configured print setting to the first image data, accepts a second print setting configured for the second image data and the identification information of the image data included in the second image data, the second print setting being different from the first print setting, specifies the first image data based on the identification information of the image data included in the second image data, and generates third image data by applying the second print setting configured for the second image data to the specified first image data.

11 Claims, 17 Drawing Sheets

(56) References Cited

U.S. PATENT DOCUMENTS

2012/0287446 A1\* 11/2012 Matsumura .......... G06K 15/005
　　　　　　　　　　　　　　　　　　　　　　358/1.6
2014/0104655 A1\* 4/2014 Nuggehalli ........ H04N 1/00233
　　　　　　　　　　　　　　　　　　　　　　358/1.15

\* cited by examiner

FIG. 12

▲ 📁 20150725_1020
　　📁 20150725_1020_printsetting
　　📁 20150725_1020_original.pdf
　　📁 20150725_1020_01.pdf
　　...

FIG. 13

▲ 📁 20150725_1120
　　📁 20150725_1020_original.pdf
　　📁 20150725_1020_01.pdf
　　📁 20150725_1020_02.pdf
　　...

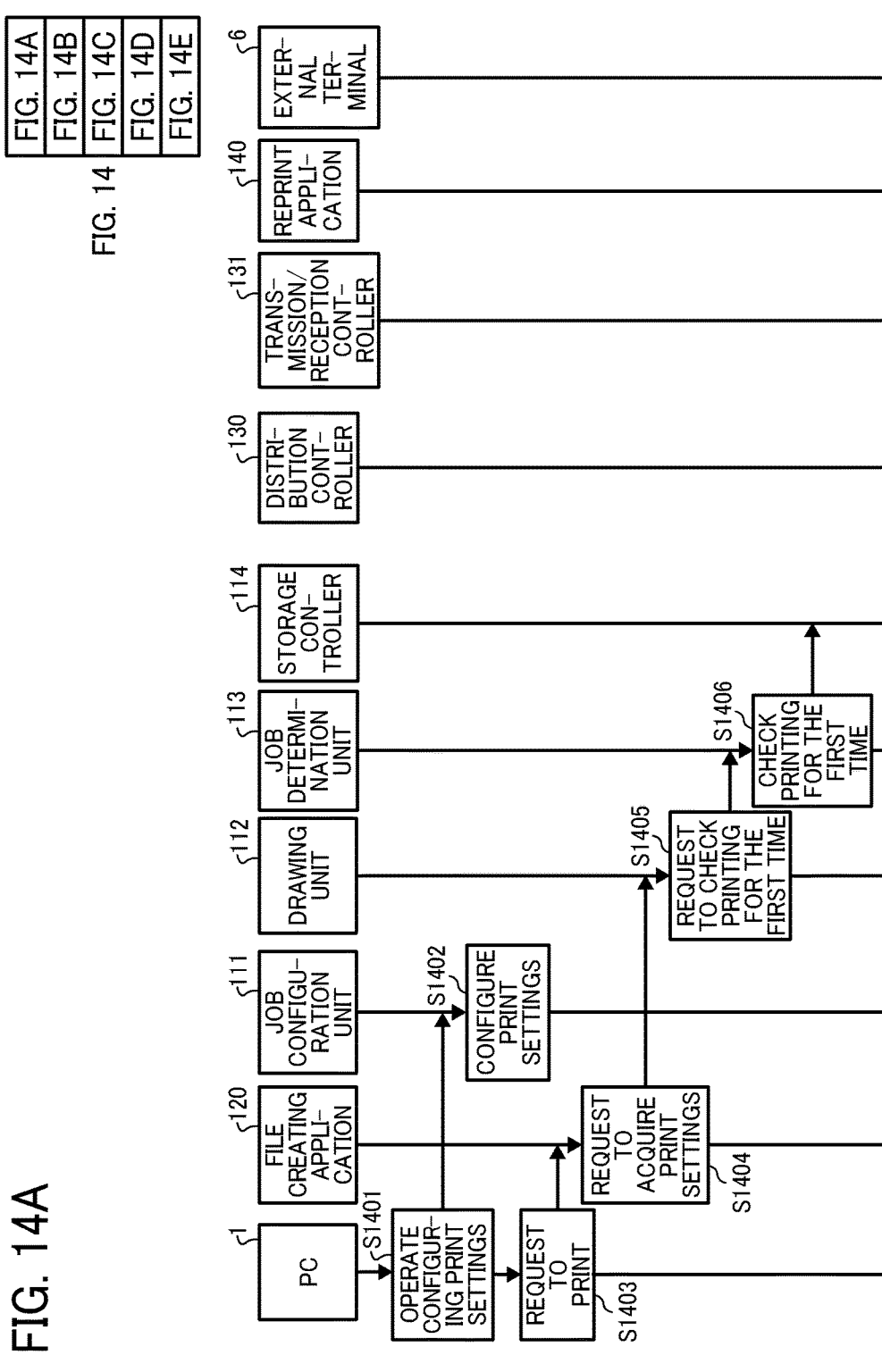

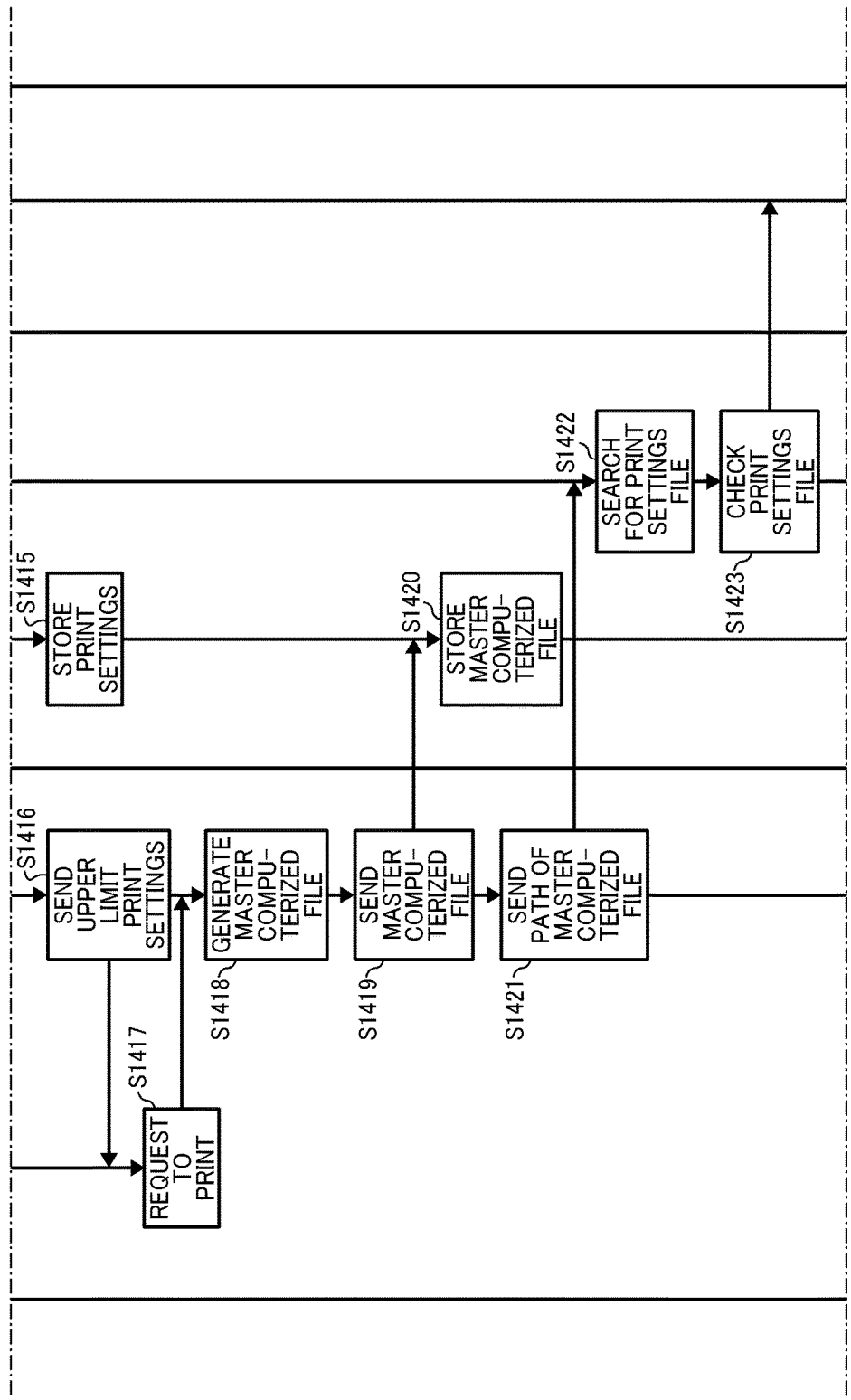

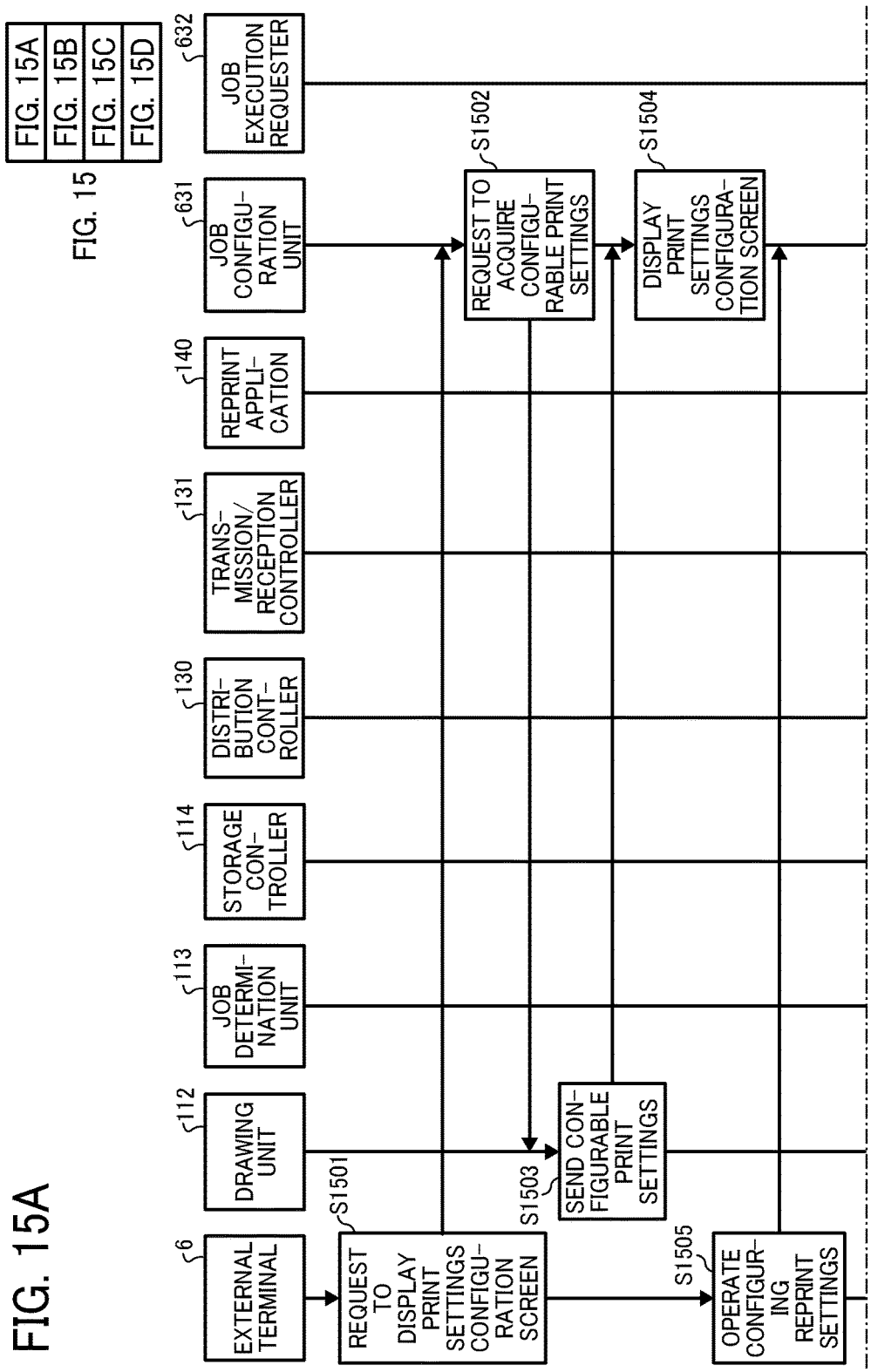

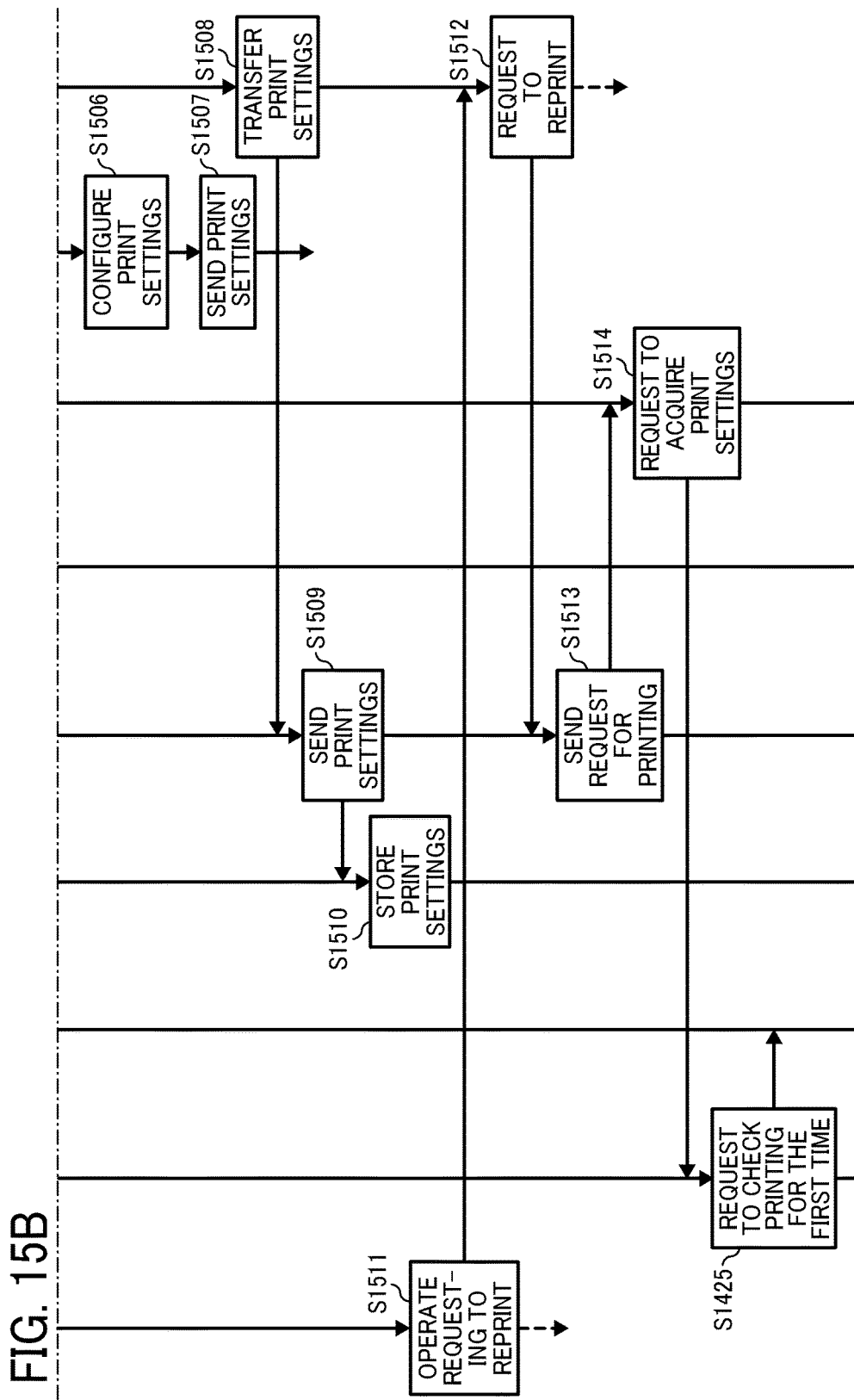

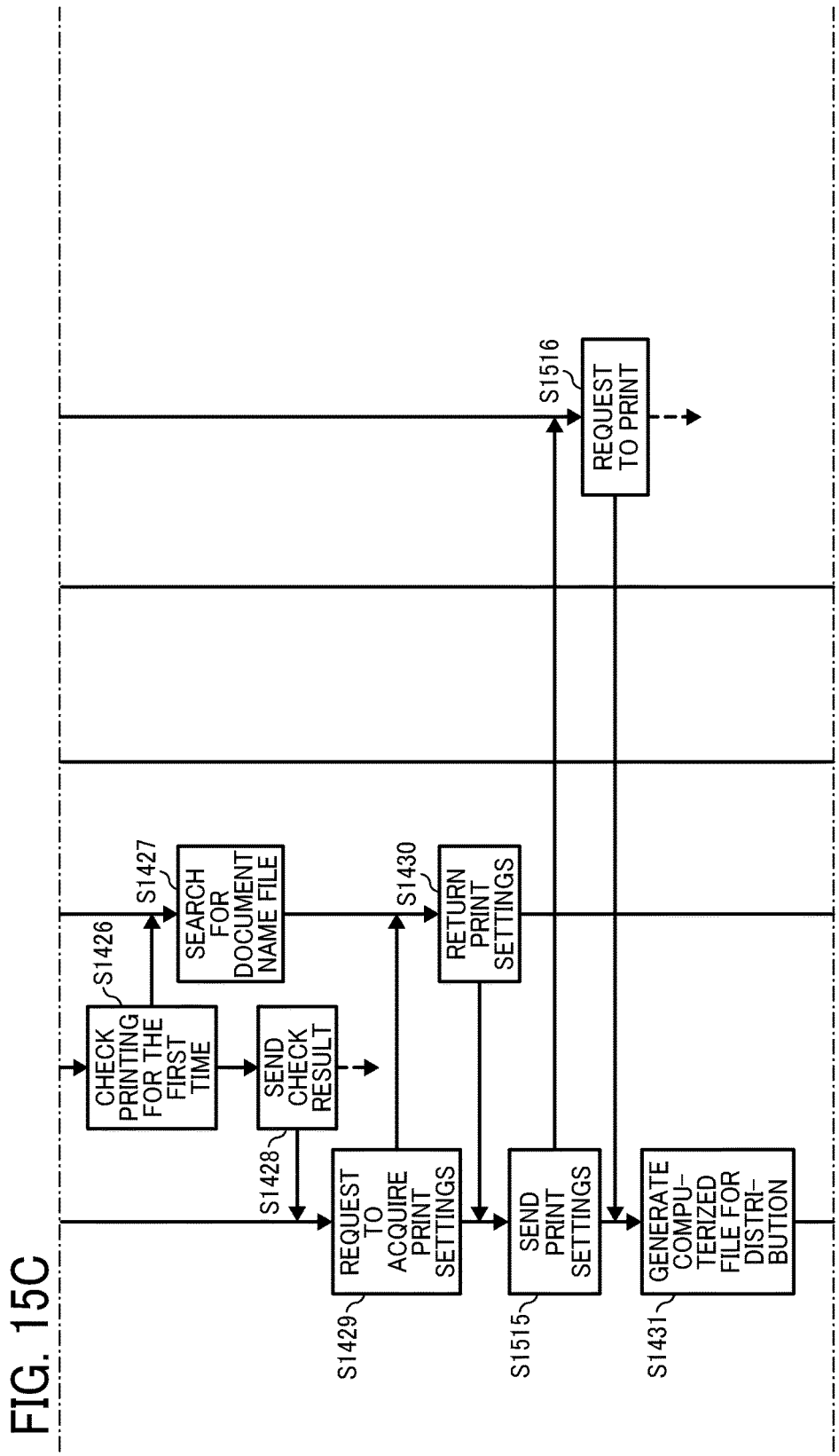

RECORDING MEDIUM, INFORMATION PROCESSING APPARATUS, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2016-027112, filed on Feb. 16, 2016 in the Japan Patent Office, the entire disclosure of which is hereby incorporated by reference herein.

BACKGROUND

Technical Field

The present invention relates to an information processing apparatus, an information processing method, and a non-transitory recording medium storing an information processing program.

Background Art

Generally, printer drivers convert data received from application into a data format compatible with a printer and transfers a converted file to the printer. Some of recent computerizing drivers convert data received from application into an image file format that enables browsing by information processing devices such as personal computers (PCs) and tablet devices etc.

Examples of such image file formats are Portable Document Format (PDF), XML Paper Specification (XPS), Tagged Image File Format (TIFF), and Joint Photographic Experts Group (JPEG), etc. Devices compatible with those data formats may handle the converted data having the above-described data formats as image files.

In addition, a technology of virtualizing drivers is known. The virtualizing drivers convert data received from application into an intermediate file using a data format such as Enhanced Meta File (EMF) etc. Subsequently, the virtualizing drivers transfer the converted intermediate file to a printer that forms an image on a recording medium such as recording paper etc. Printer drivers that actually perform printing convert the intermediate file into a data format that the printer can perform printing.

In this case, destinations where the virtualizing drivers transfer the intermediate file are not limited to printer drivers that convert the intermediate file into the image data to be printed. For example, the virtualizing driver may transfer the intermediate file to the computerizing driver to command the computerizing driver to generate a computerized file.

In a known technology, after a mail server receives e-mail attached with a computerized file from an information processing apparatus, the computerized file is stored in an image forming apparatus. Subsequently, the mail server transfers e-mail including URL specifying the image forming apparatus storing the computerized file to an information device as a destination of the e-mail. The information device as the destination requests the image forming apparatus storing the computerized file to print the computerized file.

This eliminates a need for selecting a printer driver to be used for a specific image forming apparatus as a destination of e-mail by user operation on the information processing apparatus as a source of the e-mail.

SUMMARY

Example embodiments of the present invention provide a novel information processing apparatus that includes circuitry that accepts a configured print setting for generating image data, generates identification information for identifying the image data, generates first image data based on a first print setting different from the configured print setting, stores, in a memory, the identification information of the image data and the first image data associated with each other, generates second image data including the identification information of the image data by applying the configured print setting to the first image data, accepts a second print setting configured for the second image data and the identification information of the image data included in the second image data, the second print setting being different from the first print setting, specifies the first image data based on the identification information of the image data included in the second image data, and generates third image data by applying the second print setting configured for the second image data to the specified first image data.

Further example embodiments of the present invention provide a method of processing information and a non-transitory recording medium storing an information processing program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 12 is a diagram illustrating a configuration of a folder where the computerized file is stored as an embodiment of the present invention;

FIG. 13 is a diagram illustrating a configuration of a folder where the computerized file is stored as an embodiment of the present invention;

FIGS. 14A, 14B, 14C, 14D, and 14E are sequence charts illustrating an operation of generating a master computerized file as an embodiment of the present invention;

FIGS. 15A, 15B, 15C, and 15D are sequence charts illustrating an operation of generating a computerized file specifying print settings from the external terminal as an embodiment of the present invention;

DETAILED DESCRIPTION

Figure 1:
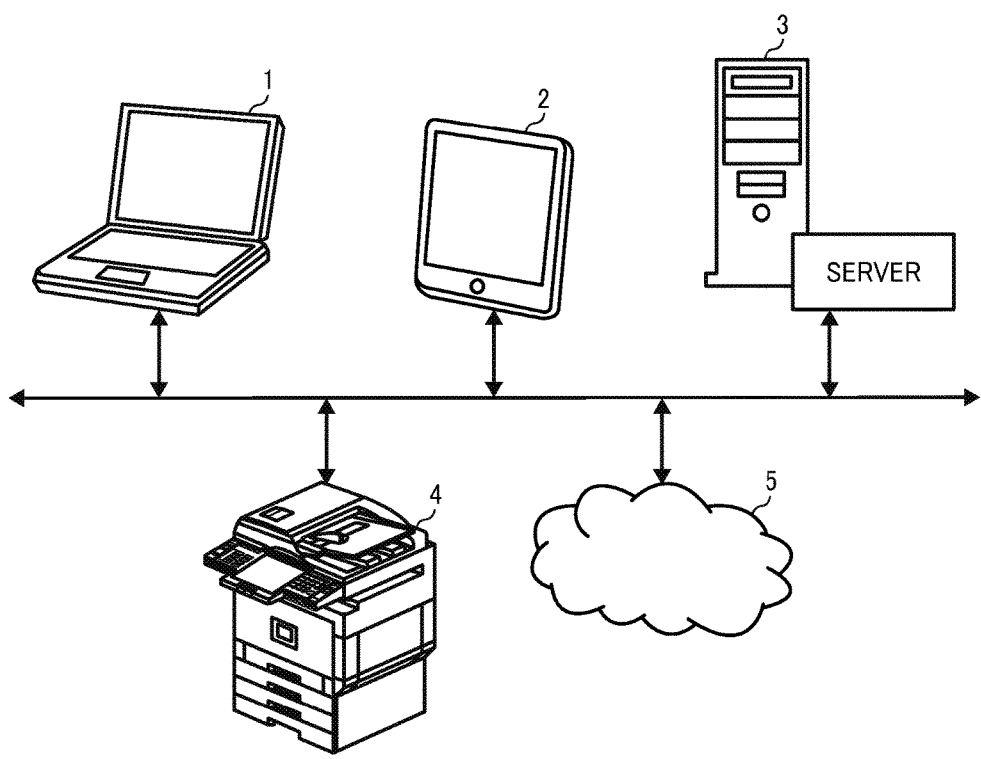
FIG. 1 is a diagram illustrating a network configuration of an information distributing system as an embodiment of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

In this embodiment, a system that information processing apparatuses such as a PC and a tablet device and image processing apparatuses are connected with each other via a network is described below as an example. It should be noted that a multifunction peripheral (MFP) including an image scanner is described below as the image processing apparatus in this embodiment.

FIG. 1 is a diagram illustrating a network configuration of an information distributing system in this embodiment. As illustrated in FIG. 1, the information distributing system in this embodiment includes a PC 1, a smart device 2, a server 3, an image processing apparatus 4, and a cloud server 5. The PC 1, the smart device 2, the server 3, the image processing apparatus 4, the cloud server 5 are connected with each other via a network. The PC 1 exchanges information such as an image file etc. with the smart device 2, the server 3, the image processing apparatus 4, and the cloud server 5 via the network, which may be wired or wireless. The information may be exchanged via any port such as through a Universal Serial Bus (USB). Hereinafter, if it is unnecessary to distinguish among the smart device 2, the server 3, the image processing apparatus 4, and the cloud server 5, these devices including the smart device 2, the server 3, the image processing apparatus 4, and the cloud server 5 are collectively referred to as an external terminal 6.

The PC 1 is an example information processing apparatus operated by a user. The PC 1 is installed with a printer driver 110 (FIG. 3) for controlling the image processing apparatus 4. The PC 1 generates and transfers a print job for commanding the image processing apparatus 4 supported by the printer driver 110 installed on the PC 1 in response to a user request.

The smart device 2 is an example information processing apparatus such as a smartphone or a tablet terminal etc. The smart device 2 in this example operates as a destination that receives information transferred by the PC 1. The server 3 is an example information processing apparatus that operates as a destination that receives and stores information according to a request for uploading by the client terminal. For example, in a conference system including multiple client terminals such as PCs, each client terminal may request for uploading some information to the server 3.

The image processing apparatus 4 is a MFP having an image pickup capability, image forming capability, and communication capability and can be used as a printer, facsimile, scanner, and copier. For example, based on image information included in a print job transferred by the PC 1, the image processing apparatus 4 functions as a color printer or a monochrome printer that generates drawing information in CMYK or monochrome and forms and outputs an image based on the generated drawing information.

The cloud server 5 provides a storage service for uploading and storing information on the Internet such as Dropbox (registered trademark) and SkyDrive (registered trademark).

In the information distributing system in this embodiment, the printer driver 110 acquires data generated by application installed on the PC 1, such as a document creating application or an image editing application, and computerizes the data to generate a computerized file. Subsequently, the generated computerized file is transferred from the PC 1 to the external terminal 6. In this case, for example, to display multiple pages of the computerized file being displayed on the smart device 2, it is required to instruct the PC 1 to perform an imposing operation of allocating the multiple pages of the computerized file on one page for display.

However, on the smart device 2, in some cases, it is difficult to specify where data generated by the application is stored in the PC 1. In view of this, the computerized file is regenerated by modifying print settings such as the imposing operation in this embodiment.

Figure 2:
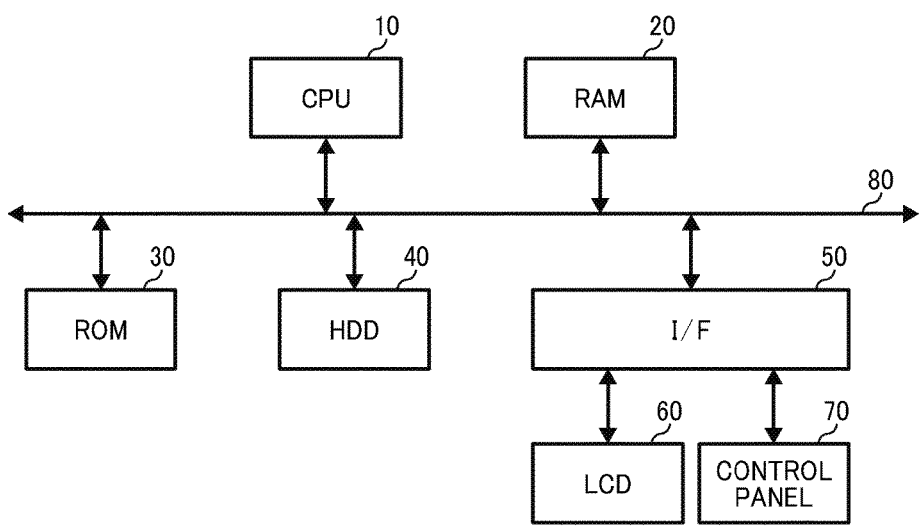
FIG. 2 is a block diagram illustrating a hardware configuration of an image processing apparatus as an embodiment of the present invention.

FIG. 2 is a block diagram illustrating a hardware configuration of the image processing apparatus 4 in this embodiment. In the below description, a hardware configuration of the image processing apparatus 4 is described as an example. However, the PC 1, the smart device 2, the server 3, and the cloud server 5 each has a hardware configuration that is substantially similar to the hardware configuration described in FIG. 2.

As illustrated in FIG. 2, the image processing apparatus 4 in this embodiment includes a controller having the same configuration as a general PC and a server. Specifically, the image processing apparatus 4 according to this embodiment includes a central processing unit (CPU) 10, a random access memory (RAM) 20, a read only memory (ROM) 30, a hard disc drive (HDD) 40, and an interface (I/F) 50, which are connected to one another via a bus 80. In addition, a Liquid Crystal Display (LCD) 60 and a control panel 70 are connected to the I/F 50. In configurations of the server 3 and the cloud server 5, the LCD 60 and the control panel 70 may be omitted. It should be noted that the image processing apparatus 4 further includes an engine to implement a scanner and printer etc. in addition to the hardware configuration of the controller illustrated in FIG. 2.

The CPU 10 is a processor, which controls the whole operation of the image processing apparatus 4. The RAM 20 is a volatile memory that can read or write information at high speed and is used as a work area when the CPU 10 processes information. The ROM 30 is a read-only non-volatile storage medium, which stores programs such as firmware. The HDD 40 is a non-volatile storage medium that can read or write information and stores the OS, various control programs, and application programs etc.

The I/F 50 connects the bus 80 with various hardware and network etc. to control communication with the connected hardware or device. The LCD 60 is a visual user interface to allow the user to check a status of the image processing apparatus 4. The control panel 70 is a user interface that allows a user to input data to the image processing apparatus 4. In this embodiment, the control panel 70 includes a touch panel and a hardware key.

The image processing apparatus 4 further includes hardware for implementing capabilities specific to the image processing apparatus 4 such as a print engine that forms an image on paper and a scanner that scans an image on paper.

In the above-described hardware configuration, a program stored in the ROM 30, the HDD 40, or another recording medium such as an optical disc is read out to the RAM 20. As the CPU 10 performs a calculation according to the program, hardware in FIG. 2 performs various operations and functions according to the program.

Figure 3:
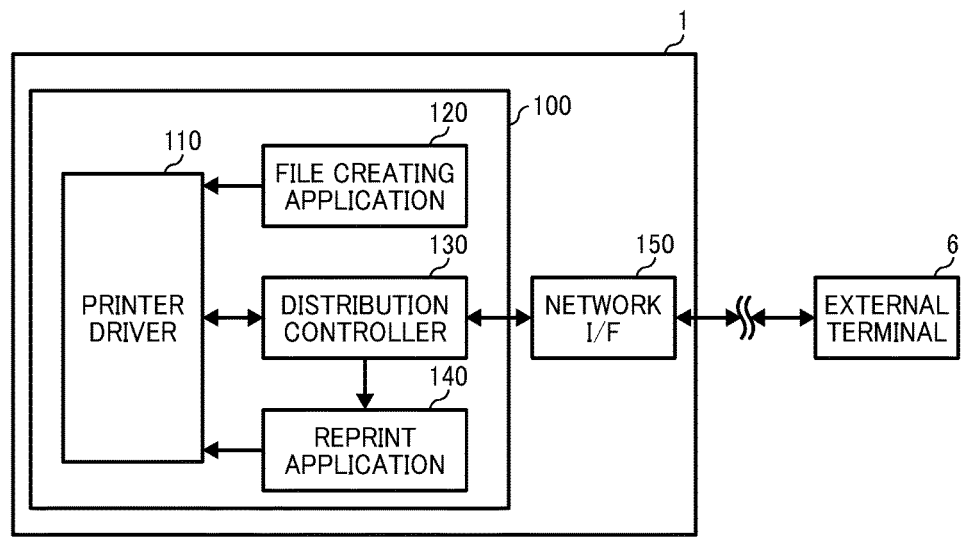
FIG. 3 is a block diagram illustrating a functional configuration of a PC as an embodiment of the present invention.

Next, a functional configuration of the PC 1 in this embodiment is described below with reference to FIG. 3. FIG. 3 is a block diagram illustrating a functional configuration of the PC 1. As illustrated in FIG. 3, the PC 1 in this embodiment includes a controller 100 and a network I/F 150.

The controller 100 is implemented by the CPU 10 that operates according to the program stored in the memory. Specifically, a program that is stored in the ROM 30, a nonvolatile memory, or a non-volatile storage medium such as the HDD 40 and an optical disc is loaded to a volatile memory such as the RAM 20 (hereinafter referred to as "a memory").

The controller 100 includes the printer driver 110, a file creating application 120, a distribution controller 130, and a reprint application 140. The printer driver 110 generates a print job for printing data such as an image and document created by the file creating application 120.

Figure 4:
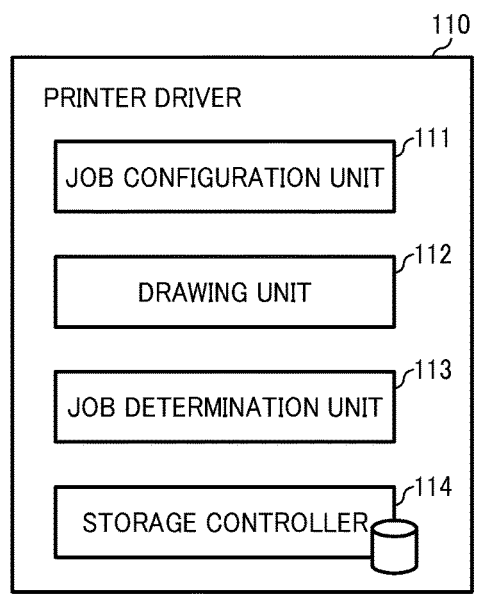
FIG. 4 is a block diagram illustrating a functional configuration of a printer driver as an embodiment of the present invention.

As illustrated in FIG. 4, the printer driver 110 includes a job configuration unit 111, a drawing unit 112, a job determination unit (determining unit) 113, and a storage controller 114. The job configuration unit 111 configures print settings in accordance with a print request transferred by the file creating application 120. In this case, the print request is generated in accordance with user operation that operates a screen of configuring print settings (described later) by a user operating the file creating application 120.

The drawing unit 112 draws an image to be formed by the image processing apparatus 4 based on the data generated by the file creating application 120 and the print settings configured by the job configuration unit 111. The drawing information generated by the drawing unit 112 is used as information on an image to be printed out or as a computerized file.

The job determination unit 113 receives a print job and determines whether or not the print job is a job that regenerates a computerized file. The storage controller 114 stores the print settings configured by the job configuration unit 111 and the computerized file generated by the drawing unit 112 associating with each other in a storage area such as the HDD 40 etc. Regarding the operation performed by the job determination unit 113, based on the print settings stored in the HDD 40, it is determined whether or not the computerized file is to be regenerated.

As described above, the printer driver 110 in this embodiment performs operations on the data and computerized file generated by the file creating application 120 (described later). Other functions of the controller 100 are described below.

For example, the file creating application 120 is a software program that creates a document and image such as Microsoft Word etc. The file creating application 120 transfers data of the created document and image etc. to the printer driver 110. In this embodiment, the computerized information include the data of document and image created by the file creating application 120, and data of document and image printed from a web page browsed by a web browser installed on the PC 1.

The file creating application 120 in this embodiment is not limited to an application that can create a file. Even an application that can only browse a file may be regarded as the file creating application 120 as long as the application that can request to print from the application.

The distribution controller 130 transfers the computerized file received from the printer driver 110 to the external terminal 6 or requests the printer driver 110 to reprint the computerized file.

Figure 5:
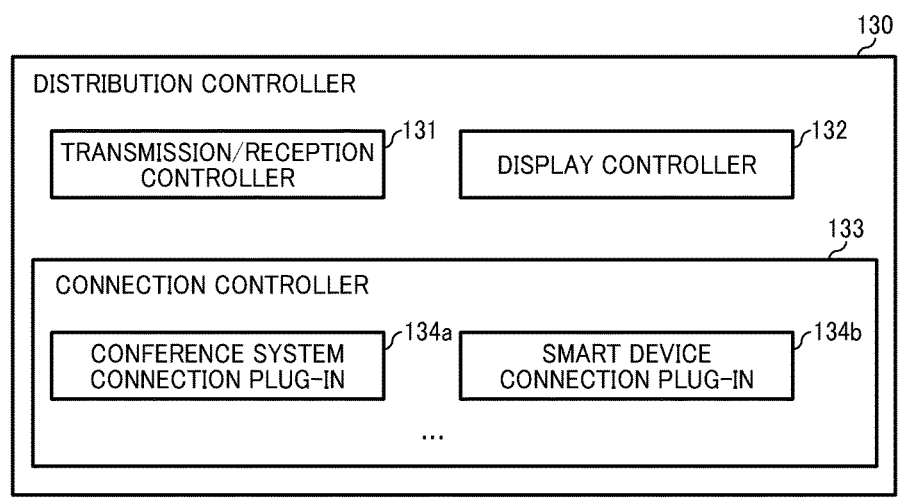
FIG. 5 is a block diagram illustrating a functional configuration of a distribution controller as an embodiment of the present invention.

As illustrated in FIG. 5, the distribution controller 130 includes a transmission/reception controller 131, a display controller 132, and a connection controller 133. The transmission/reception controller 131 controls transferring or receiving information in the distribution controller 130. More specifically, the transmission/reception controller 131 distributes the computerized file whose path is received from the drawing unit 112 or transfers the computerized file to the reprint application 140 to request to reprint.

The display controller 132 displays, on a display, a screen that requests the user to select the external terminal as a destination where the computerized file is transferred and a dialog to be operated by a user in managing a device connecting plug-in (described later).

The connection controller 133 includes the device connecting plug-in that exchanges information such as the computerized file etc. with the external terminal 6 connected to the PC 1. The device connecting plug-in performs operation, which enables various PCs 1 to transfer information to the external terminal 6 in response to a user operation on the PC 1 to request printing.

More specifically, since file transfer protocols and browsable file formats are different among the external terminals 6, the connection controller 133 performs a connecting operation in accordance with each external terminal 6 connected to the PC 1. It should be noted that the connection controller 133 includes a conference system connecting plug-in 134a that performs an operation of connecting to the server 3 and a smart device connecting plug-in 134b that performs an operation of connecting to the smart device 2.

Referring back to FIG. 3, description of the functional configuration of the PC 1 continues. The reprint application 140 in FIG. 3 is, for example, a software program such as Adobe Acrobat (registered trademark) that creates, edits, processes, and manages a computerized file. In this embodiment, the reprint application 140 reprints the computerized file. The reprint application 140 is not always provided with the editing function. Even an application that can only browse a file may be regarded as the reprint application 140 as long as the application can request the printer driver 110 to print.

The network I/F 150 is an interface that the PC 1 communicates with other apparatuses via a network, and an interface such as Ethernet (registered trademark) and USB I/F is used for the network I/F 150. The network I/F 150 is implemented by the I/F 50 illustrated in FIG. 2.

Figure 6:
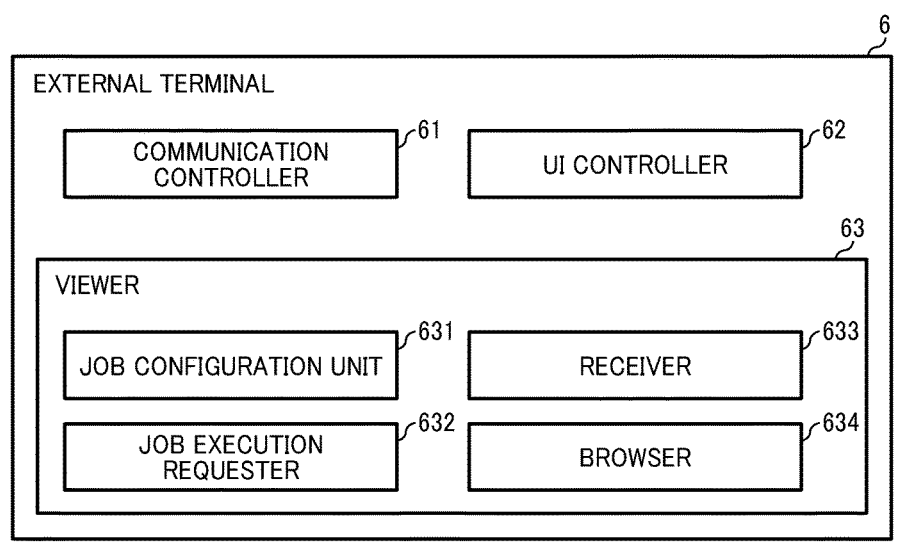
FIG. 6 is a block diagram illustrating a functional configuration of an external terminal as an embodiment of the present invention.

Next, a functional configuration of the external terminal 6 is described below with reference to FIG. 6. FIG. 6 is a block diagram illustrating a functional configuration of the external terminal 6 in this embodiment. As illustrated in FIG. 6, the external terminal 6 in this embodiment includes a communication controller 61, a UI controller 62, and a viewer 63.

The communication controller 61 controls transferring or receiving information in the external terminal 6. More specifically, the communication controller 61 transfers the computerized file sent by the PC 1 to the viewer 63 (described later). In addition, the communication controller 61 acquires command information that commands to execute a print job from a job execution requester 632 (described later) and transfers the acquired command information to the PC 1. The UI controller 62 performs an operation of displaying a UI for configuring print settings and transfers an operation signal performed on the UI for configuring print settings to a job configuration unit 631 (described later).

The viewer 63 is application software for browsing a computerized file on the external terminal 6 and further configures print settings for reprinting the computerized file by modifying the print settings of the browsed computerized file. It should be noted that the communication controller 61 and the UI controller 62 may be alternatively included inside the viewer 63.

To perform the operation described above, the viewer 63 includes the job configuration unit 631 that configures print settings in accordance with operations performed by a user of the external terminal 6, the job execution requester 632 that transfers information for requesting to reprint a computerized file to the PC 1, a receiver 633 that receives the computerized file via the connection plug-in 134, and a browser 634 that performs an operation for making the computerized file browsable on the external terminal 6. Based on the print settings configured by the job configuration unit 631 and the information of reprinting the computerized file, the reprint application 140 performs reprinting.

In the information distributing system in this embodiment, the computerized file is reprinted in accordance with the request to reprint from the external terminal 6. In addition, the external terminal 6 is not limited to one type of the information processing apparatus, and reprinting in accordance with each external terminal 6 is performed.

Figure 7:
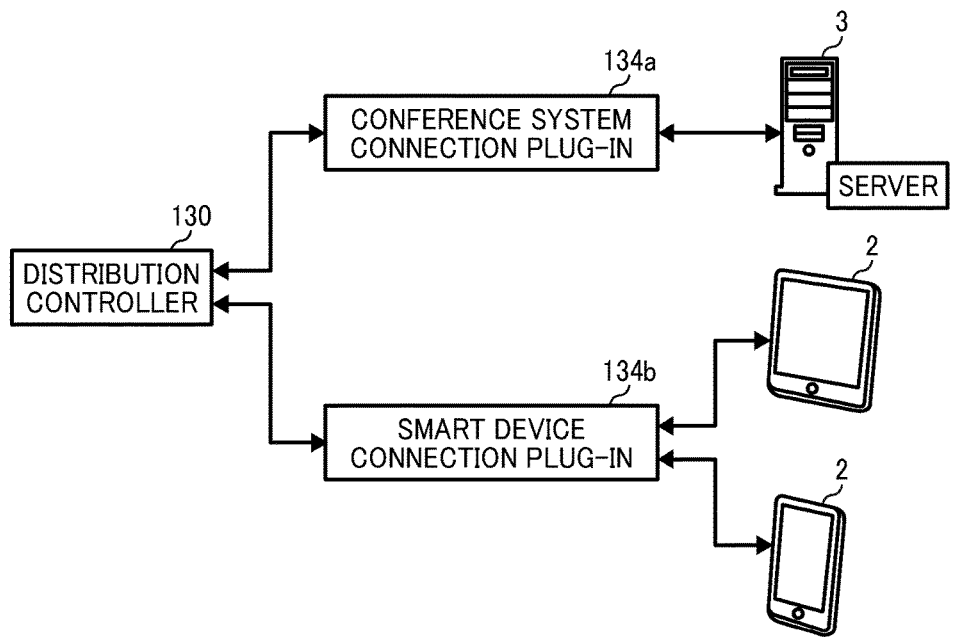
FIG. 7 is a diagram illustrating how a connection is configured when a computerized file is distributed to the external terminal as an embodiment of the present invention.

FIG. 7 is a diagram illustrating a configuration of connections among the devices when a computerized file is distributed to the external terminal in this embodiment. As illustrated in FIG. 7, the distribution controller 130 controls connection between the PC 1 and the external terminal 6. For example, the PC 1 is connected to the server 3 via the conference system connection plug-in 134a, and the PC 1 is connected to the smart device 2 via the smart device connection plug-in 134b.

Figure 8:
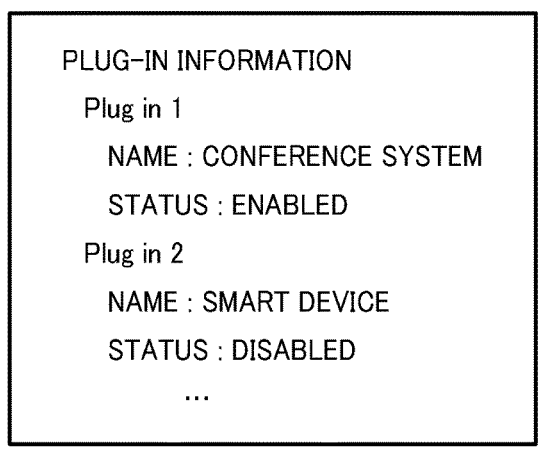
FIG. 8 is a diagram illustrating plug-in data stored in the distribution controller as an embodiment of the present invention.

In addition, the distribution controller 130 stores plug-in information as information for identifying the external terminal 6 connected to the PC 1. FIG. 8 is a diagram illustrating plug-in data stored in the distribution controller 130 in this embodiment. As illustrated in FIG. 8, the plug-in information includes information on a type of the external terminal 6 as a connecting destination and information indicating whether the plug-in is enabled or disabled.

In this case, when a path of the computerized file is reported by the drawing unit 112, the distribution controller 130 transfers the computerized file to the external terminal 6 by not using the disabled connection plug-in 134 but using the enabled connection plug-in 134. As a result, on a screen of managing device connection plug-ins displayed by the display controller 132, the connection plug-in corresponding to a selected device is considered as enabled, and the connection plug-in that is not selected is considered as disabled.

Figure 9:
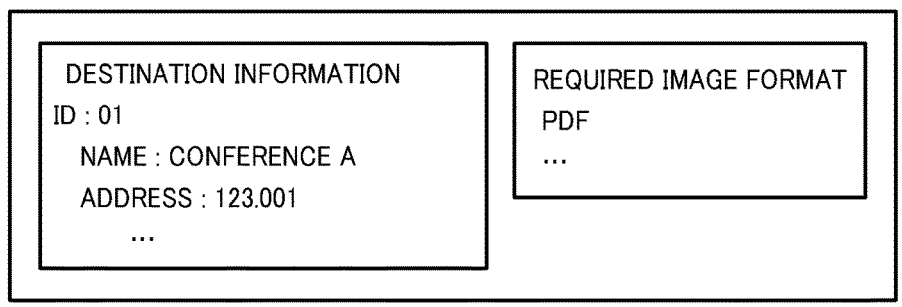
FIG. 9 is a diagram illustrating data stored by a conference system connection plug-in as an embodiment of the present invention.

FIG. 9 is a diagram illustrating data stored by the conference system connection plug-in 134a that connects the PC 1 to the server 3 in this embodiment. As illustrated in FIG. 9, the conference system connection plug-in 134a includes information on the server 3 as a destination of information transferred by the PC 1 as destination information. More specifically, the destination information at least includes information associating a name of the destination and an IP address, with a destination ID. In addition, the destination information includes information indicating an image format usable on the server 3.

Figure 10:
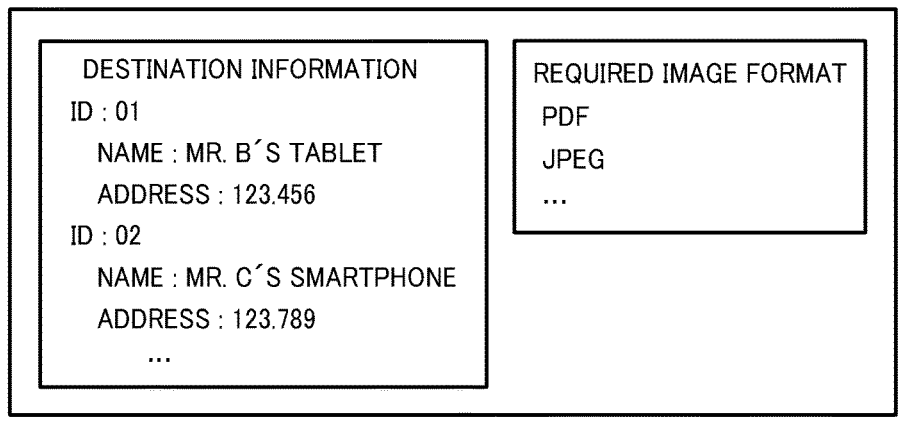
FIG. 10 is a diagram illustrating data stored by a smart device connection plug-in as an embodiment of the present invention.

FIG. 10 is a diagram illustrating data stored by the smart device connection plug-in 134b that connects the PC 1 to the smart device 2 in this embodiment. As illustrated in FIG. 10, the smart device connection plug-in 134b includes information on the smart device 2 as a destination of information transferred by the PC 1 as destination information. More specifically, the destination information at least includes information associating a name of the destination an IP address with a destination ID. In addition, the destination information includes information indicating an image format usable on the smart device 2.

As described above, the connection plug-in for connecting to the external terminal 6 is implemented in the PC 1. The connection plug-in is prepared for each type of the external terminal 6 as the connecting destination and can be added or deleted.

Figure 11:
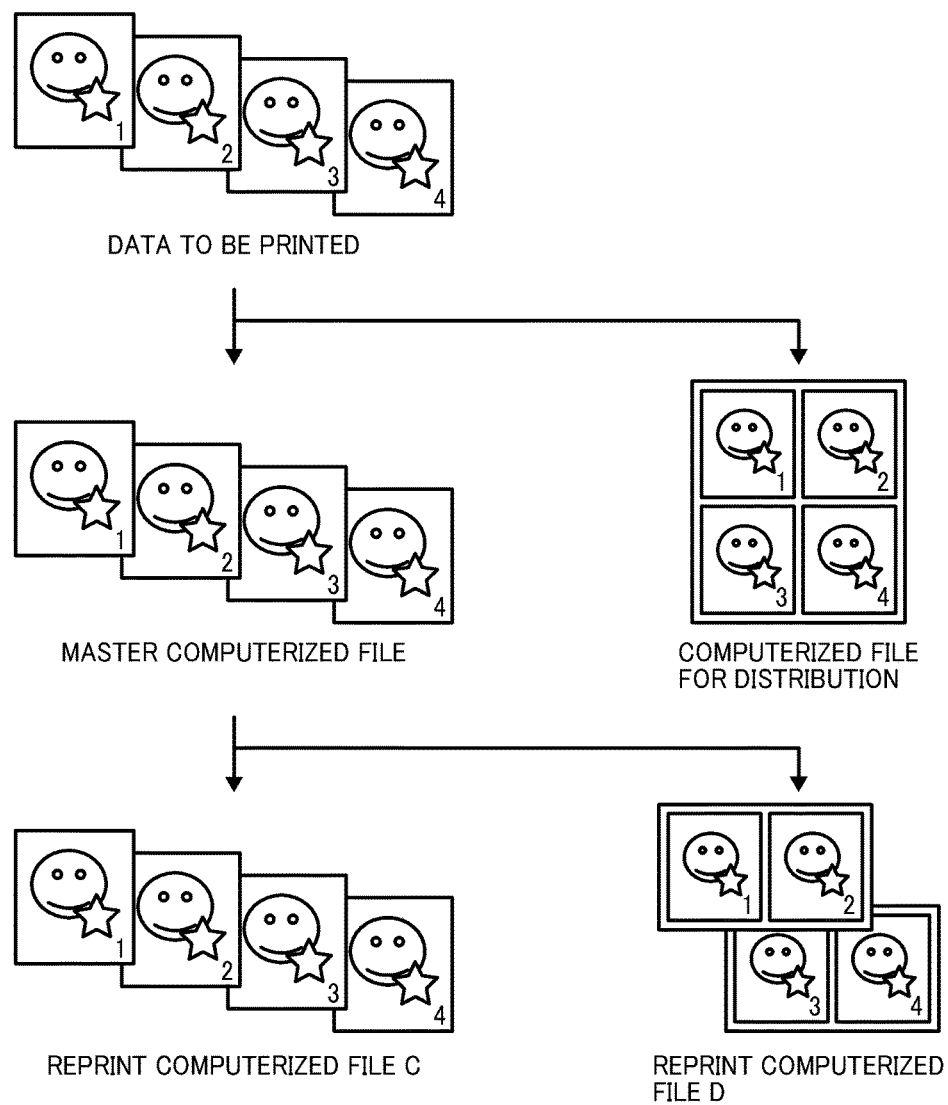
FIG. 11 is a diagram illustrating how the computerized file is generated by the printer driver as an embodiment of the present invention.

In the information distributing system as described above, an operation that the printer driver 110 generates the computerized file based on the data of the document and image created by the file creating application 120 is described below with reference to FIG. 11. FIG. 11 is a diagram illustrating operation of generating the computerized file by the printer driver 110 in this embodiment.

The upper part of FIG. 11 illustrates a file of an image to be printed, which is data generated by the file creating application. Subsequently, based on the data generated by the file creating application 120, the drawing unit 112 generates a master computerized file, as a computerized file to be used as an image file for regenerating a computerized file based on print settings configured by the external terminal 6.

In this case, the master computerized file is generated with maximum values of print settings executable on the printer driver 110. For example, if the print settings items include such as color/monochrome, page consolidation, and resolution, the master computerized file is generated by setting "color" for color/monochrome, setting 1 (i.e., none) for page consolidation, and setting 1200 for resolution (if options are 1200 and 600). The maximum print settings values are parameters to be used by the drawing unit 112 in generating an image file in the best quality, and these values are specific to the drawing unit 112. In a printer driver for another type of an image processing apparatus, the maximum print settings vary. Here, in regenerating a computerized file based on the master computerized file, an executable maximum print settings indicate that it is possible to apply all of configurable print settings in the printer driver 110.

A computerized file for distribution is generated based on print settings configured when the data generated by the file creating application 120 is printed. The computerized file for distribution described above is transferred to the external terminal 6. Regarding reprint computerized files C and D, print settings are modified respectively based on the master computerized file and generated by computerizing the master computerized file. Therefore, the reprint computerized files C and D becomes the computerized file for distribution in some cases.

In known technologies, in distributing computerized files, in order to generate a computerized file whose print settings are modified by the external terminal 6 as the destination of the computerized file for distribution, it is required to specify an area where data such as a document and an image generated by the application stored in the PC 1. To cope with this issue, in this embodiment, the master computerized file is generated from data generated by the file creating application applying the maximum print settings, and reprint is performed applying print settings specified for the master computerized file. As a result, it is unnecessary to specify the area where the data generated by the application stored in the PC 1 from the external terminal 6.

It should be noted that the master computerized file, the computerized file for distribution, and reprint computerized file are stored in a folder which is created newly every time the data generated by the document creating application and the image editing application is printed and the computerized file is printed from a web page. FIGS. 12 and 13 are diagrams illustrating configurations of folders where the computerized files are stored in this embodiment.

In FIG. 12, folders that store print setting files as information indicating settings for processing an image are illustrated. Print settings files are stored associated with information that can identify a print job generated when the data generated by the document creating application and the image editing application is printed. In some cases, the print setting file is print settings for generating the computerized file for distribution. In other cases, the print setting file is print settings for generating the reprint computerized file. Furthermore, as illustrated in FIG. 13, there is no print setting file in folders in some cases.

The distribution controller 130 in this embodiment determines whether or not the print setting file exists in any one or more folders. If there is the print setting file in any folder, the distribution controller 130 requests the reprint application 140 to reprint. By contrast, if there is no print setting file in folders, the distribution controller 130 transfers the computerized file to the external terminal 6.

As described above, depending on whether or not the print setting file exists in the folder, the distribution controller 130 determines whether the computerized file is transferred to the external terminal 6 or the reprint application 140 is requested to reprint. Accordingly, after being requested to reprint by the reprint application 140, the printer driver 110 regenerates the computerized file based on the print setting file stored in the folder.

An operation of generating the master computerized file in this embodiment is described below with reference to FIGS. 14A, 14B, 14C, 14D, and 14E. FIGS. 14A, 14B, 14C, 14D, and 14E are sequence diagrams illustrating an operation of generating the master computerized file in this embodiment. First, the job configuration unit 111 configures print settings in printing data generated by the file creating application 120. In this case, the print settings are configured by operating a screen for print settings displayed when data generated by the file creating application 120 is printed by a user of the PC 1 in S1401, and the job configuration unit 111 that functions as a print settings acceptance unit receives information transferred based on the user operation to configure the print settings in S1402.

Next, a request to print is transferred to the file creating application 120 by user operation on the PC 1 in S1403. After receiving the request to print, the file creating application 120 requests the drawing unit 112 to acquire print settings to perform printing based on the data generated by the file creating application 120 in S1404.

After receiving the request to acquire print settings, the drawing unit 112 requests the job determination unit 113 to check whether or not the data generated by the file creating application 120 is to be printed for the first time in S1405.

Next, the job determination unit 113 commands the storage controller 114 to check whether or not a file whose file name includes a name of the data generated by the file creating application 120 exists in S1406. The storage controller 114 searches for the file whose file name includes the name of the data generated by the file creating application 120 in S1407.

In this case, since the file whose file name includes the name of the data generated by the file creating application 120 does not exist, the storage controller 114 generates a document ID as identification information for identifying the master computerized file generated based on the data generated by the file creating application 120 in S1408.

Here, the document ID is generated in combination with a specific string included in the master computerized file and date/time when the master computerized file is created. The way of creating the document ID is not limited to the method described above as long as the document ID is in format that can identify the print job that creates the master computerized file uniquely. For example, it is possible that the document ID does not correspond to the file name itself but the document ID is included in a part of the file name. In addition, as long as the printer driver 110 can identify the format of the document ID, it is possible that the document ID is stored in an area other than the file name in a folder.

Furthermore, the storage controller 114 creates a folder whose folder name corresponds to the document ID in S1409. In this case, the print settings configured in S1402 and the computerized file generated by the drawing unit 112 in the folder whose folder name corresponds to the document ID generated by the storage controller 114.

The job determination unit 113 identifies the document ID based on the name of the data to be processed by the printer driver 110 and determines whether or not a file includes the identified document ID. More specifically, since the file whose file name includes the name of the data generated by the file creating application 120 in the folder created in S1409, the job determination unit 113 determines that it is in an operation of creating the master computerized file and transfers the determination result to the drawing unit 112 in S1410. If the file name does not correspond to the document ID itself (for example, if a part of the file name corresponds to the document ID etc.), similarly, the master computerized file is generated since it is impossible to identify the document ID from the name of the data generated by the drawing unit 112.

After receiving the determination result, the drawing unit 112 transfers a request to acquire the print settings configured by the job configuration unit in S1402 as a print setting file in S1411. The job configuration unit 111 transfers the print setting file to the drawing unit 112 in S1412. After acquiring the print setting file from the job configuration unit 111 in S1413, the drawing unit 112 transfers the acquired print setting file to the storage controller 114 in S1414. In S1415, the storage controller 114 stores the acquired print setting file in the folder created in S1409.

Next, the drawing unit 112 reports the maximum print settings as the information indicating the maximum print settings of the printer driver 110 to the file creating application 120 in S1416. After receiving the maximum print settings, the file creating application 120 transfers data to be printed with the maximum print settings to the drawing unit 112 to request to print the master computerized file in S1417.

Here, the maximum print settings may generate the same computerized file when the same print settings are applied to the master computerized file in a later operation.

The drawing unit 112 generates the master computerized file based on the data to be printed while applying the maximum print settings in S1418 and transfers the generated master computerized file to the storage controller 114 in S1419. In S1420, the storage controller 114 stores the received master computerized file in the folder created in S1409. In this case, the drawing unit 112 functions as a first image data generator, and the storage controller 114 functions as a storing unit.

After performing the operation in S1419, the drawing unit 112 transfers a path for specifying the master computerized file generated in S1418 to the distribution controller 130 in S1421. The distribution controller 130 searches for the print setting file through the folder created in S1409 based on the received path in S1422.

In this case, the distribution controller 130 transfers the print setting file saved in S1415 to the reprint application 140 and requests to generate the master computerized file in S1423. After receiving the request, the reprint application 140 transfers a request to print the computerized file for distribution to the drawing unit 112 in S1424.

After receiving the request to print from the reprint application 140, the drawing unit 112 requests the job determination unit 113 to check whether or not printing is performed for the first time in S1425. The job determination unit 113 commands the storage controller 114 to check whether or not the print setting file exists in the folder specified based on the document ID included in the file name of the master computerized file requested to be printed in S1426.

In this case, in S1427, after the storage controller 114 searches for the print setting file, the print setting file saved in S1415 exists in the folder created in S1409. Since the print setting file exists in the folder created in S1409, the job determination unit 113 determines that it is in an operation of creating the computerized file for distribution and transfers the determination result to the drawing unit 112 in S1428.

After receiving the determination result, the drawing unit 112 requests the storage controller 114 to acquire the print setting file and the master computerized file in S1429. In response to the request, the storage controller 114 transfers the print setting file and the master computerized file to the drawing unit 112 in S1430.

Next, the drawing unit 112 generates the computerized file for distribution from the acquired print setting file and the master computerized file in S1431 and transfers a request to delete the print setting file to the storage controller 114 in S1432. In S1433, in response to the request to delete the print setting file, the storage controller 114 deletes the print setting file transferred to the drawing unit 112 in S1430. In this case, the drawing unit 112 functions as a second image data generator.

The drawing unit 112 transfers the computerized file for distribution created in S1431 to the storage controller 114 in S1434, and, in S1435, the storage controller 114 stores the computerized file for distribution in the folder created in S1409. After transferring the computerized file for distribution to the storage controller 114, the drawing unit 112 transfers a path of the computerized file for distribution to the distribution controller 130 in S1436.

The distribution controller 130 searches for the print setting file through the folder created in S1409 based on the received path in S1437. In this case, since the print setting file saved in S1415 does not exist in the referred folder, the distribution controller 130 transfers the computerized file for distribution on the path to the transmission/reception controller 131 in S1438. After receiving the computerized file for distribution, the transmission/reception controller 131 distributes the computerized file for distribution to the external terminal 6 in S1439. The external terminal 6 displays the received computerized file for distribution via the viewer 63 in S1440.

As described above, the master computerized file in this embodiment is created. In addition, the computerized file for distribution is created by applying the configured print settings to the created master computerized file and transferred to the external terminal 6 by the distribution controller 130. As a result, in the operation described above, the master computerized file is created, after the print settings for creating the computerized file for distribution is stored in the PC 1, and the computerized file for distribution is generated by applying the saved print settings to the master computerized file.

As illustrated in FIGS. 15A, 15B, 15C, and 15D, in this embodiment, it is possible to modify the print settings on the external terminal 6 that received the computerized file for distribution and create a computerized file again. FIGS. 15A, 15B, 15C, and 15D are a sequence diagram illustrating an operation of generating a computerized file specifying print settings from the external terminal 6 in this embodiment.

After receiving the computerized file for distribution, the communication controller 61 transfers command information for displaying the computerized file for distribution on the LCD 60 to the viewer 63. After receiving the command information, the viewer 63 displays the computerized file for distribution on the LCD 60.

Figure 16:
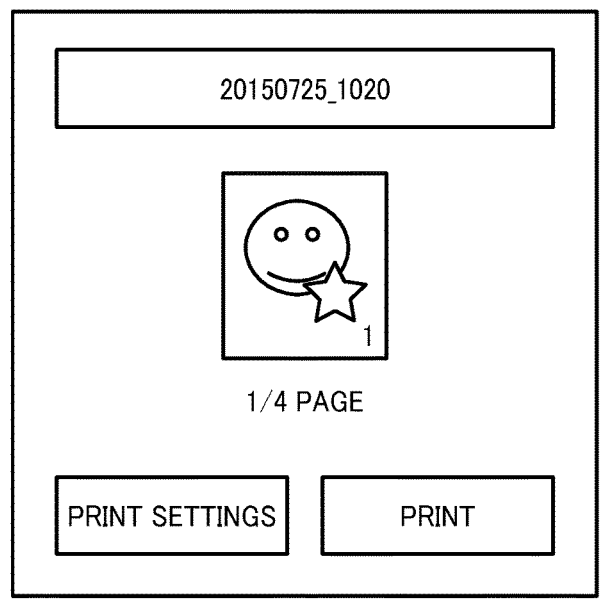
FIG. 16 is a diagram illustrating a screen displayed on a UI controller as an embodiment of the present invention.

After the external terminal 6 receives the computerized file for distribution, on the screen where the computerized file for distribution is displayed, an operation for printing the computerized file for distribution is performed by user operation, the UI controller 62 displays a screen illustrated in FIG. 16. On that screen, it is possible to select whether the computerized file for distribution is printed as is or the computerized file for distribution is printed by configuring print settings. On the screen illustrated in FIG. 16, after "print settings" button is clicked, the UI controller 62 transitions the screen to a print setting screen illustrated in FIG. 17 and starts the job configuration unit 631

After the print setting screen is operated by operation of the user of the external terminal 6, a request to display a print setting configuration screen for configuring intended print settings to the job configuration unit 631 in S1501. Subsequently, the job configuration unit 631 transfers a request to acquire configurable print settings to the drawing unit 112 in S1502. The drawing unit 112 returns information on the configurable print settings to the job configuration unit 631 in S1503.

The job configuration unit 631 commands the UI controller 62 to display a print setting configuration screen for configuring print settings based on the configurable information in S1504. Subsequently, by operating the print setting configuration screen displayed in S1504 by operation of the user of the external terminal 6, print settings are input. The job configuration unit 631 configures print setting based on the user operation in S1506 and transfers information on the configured print settings to the job execution requester 632 in S1507. The job execution requester 632 transfers the information on the configured print settings to the PC 1 in S1508.

The distribution controller 130 acquires information on the received print settings and transfers the information to the printer driver 110 in S1509. The storage controller 114 stores the information on the print settings as a print setting file in the folder same as the computerized file for distribution distributed to the external terminal 6 in S1510. In this case, the document ID included in the computerized file for distribution is included in the print setting file. Therefore, the storage controller 114 may specify the folder where the print setting file is stored.

Figure 17:
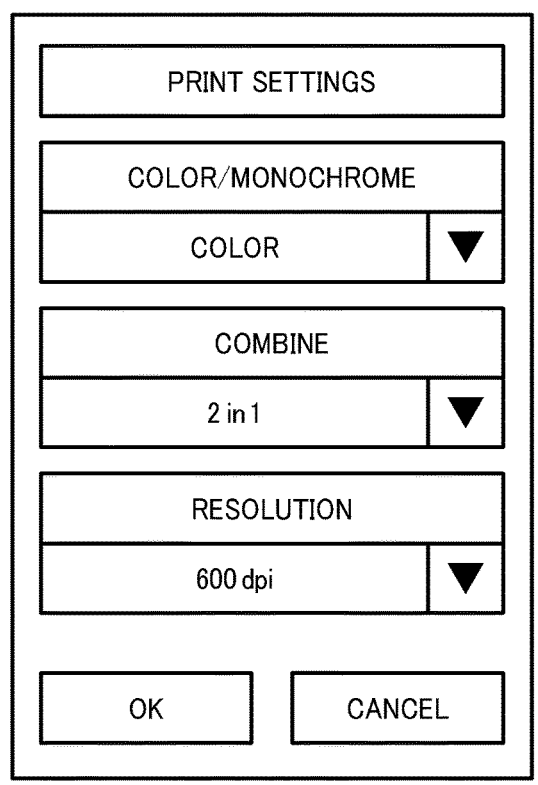
FIG. 17 is a diagram illustrating a print configuration screen displayed on a UI controller as an embodiment of the present invention.

After configuring the print settings on the screen in FIG. 17, the UI controller 62 displays the screen in FIG. 16 again. Here, if "print" button is clicked in S1511, the UI controller 62 starts the job execution requester 632. Subsequently, the job execution requester 632 transfers a request to create a reprint computerized file to the distribution controller 130 in S1512. In this case, the document ID of the computerized file for distribution is included in the request information. Therefore, it is possible to specify the master computerized file as a source of the computerized file for distribution.

After receiving the request information, the distribution controller 130 transfers the request information to the reprint application 140 in S1513. The reprint application 140 specifies a folder that includes the master computerized file to be reprinted based on the document ID and transfers a path of the folder to the drawing unit 112 to request to acquire print settings in S1514. As a result, the distribution controller 130 functions as a data acceptance unit.

Figure 14B:
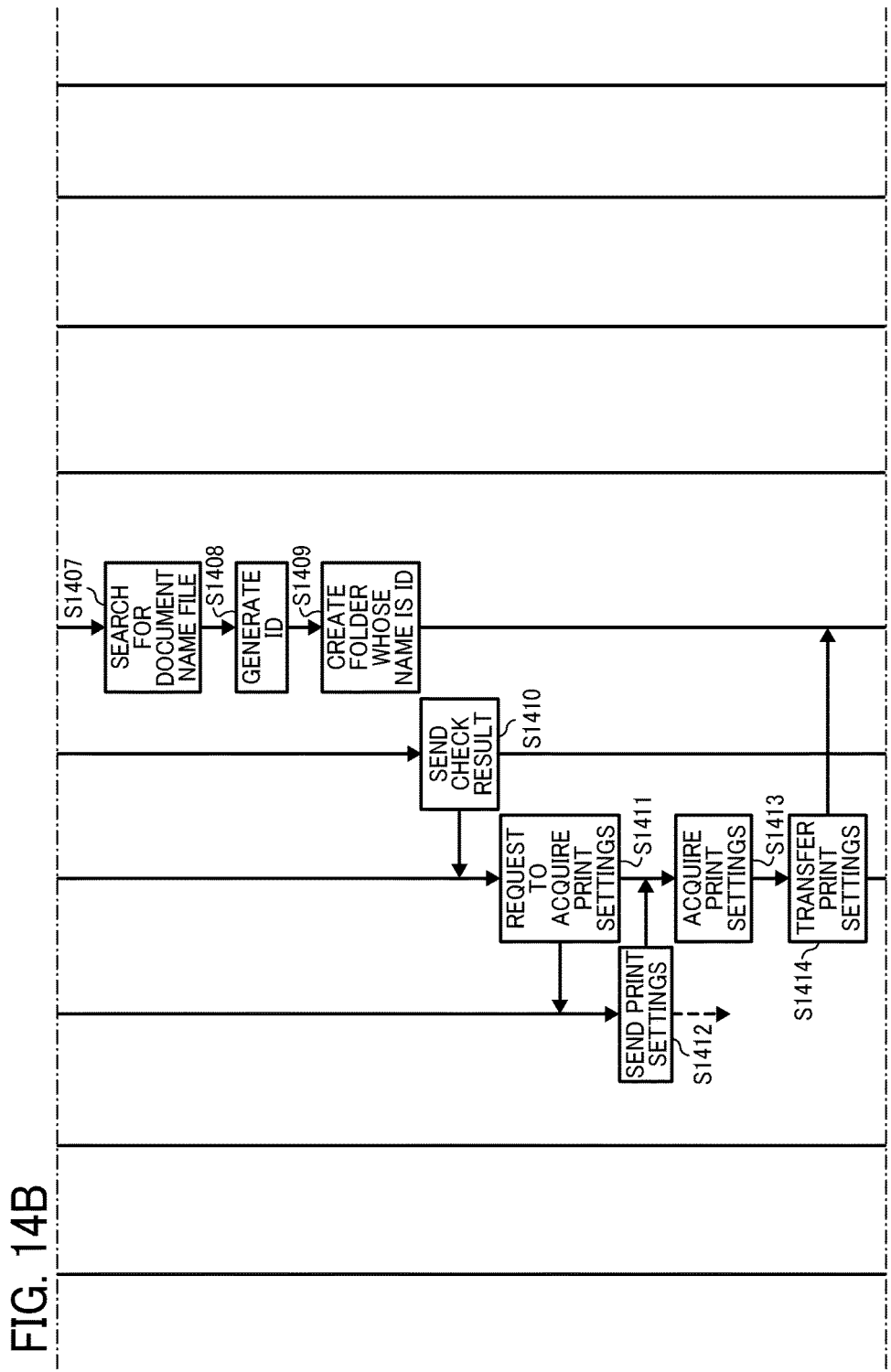
Figure 14D:
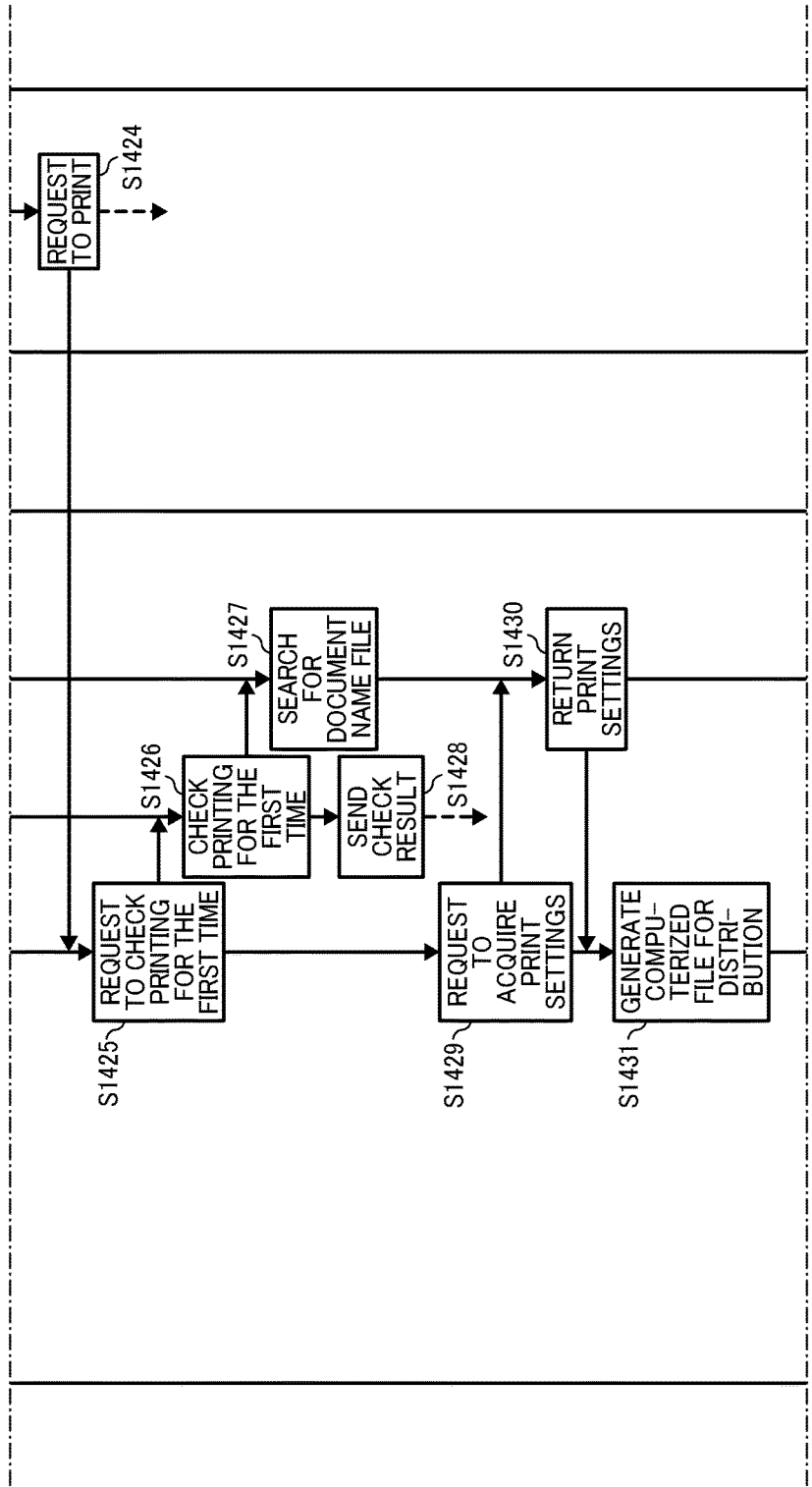
Figure 14E:
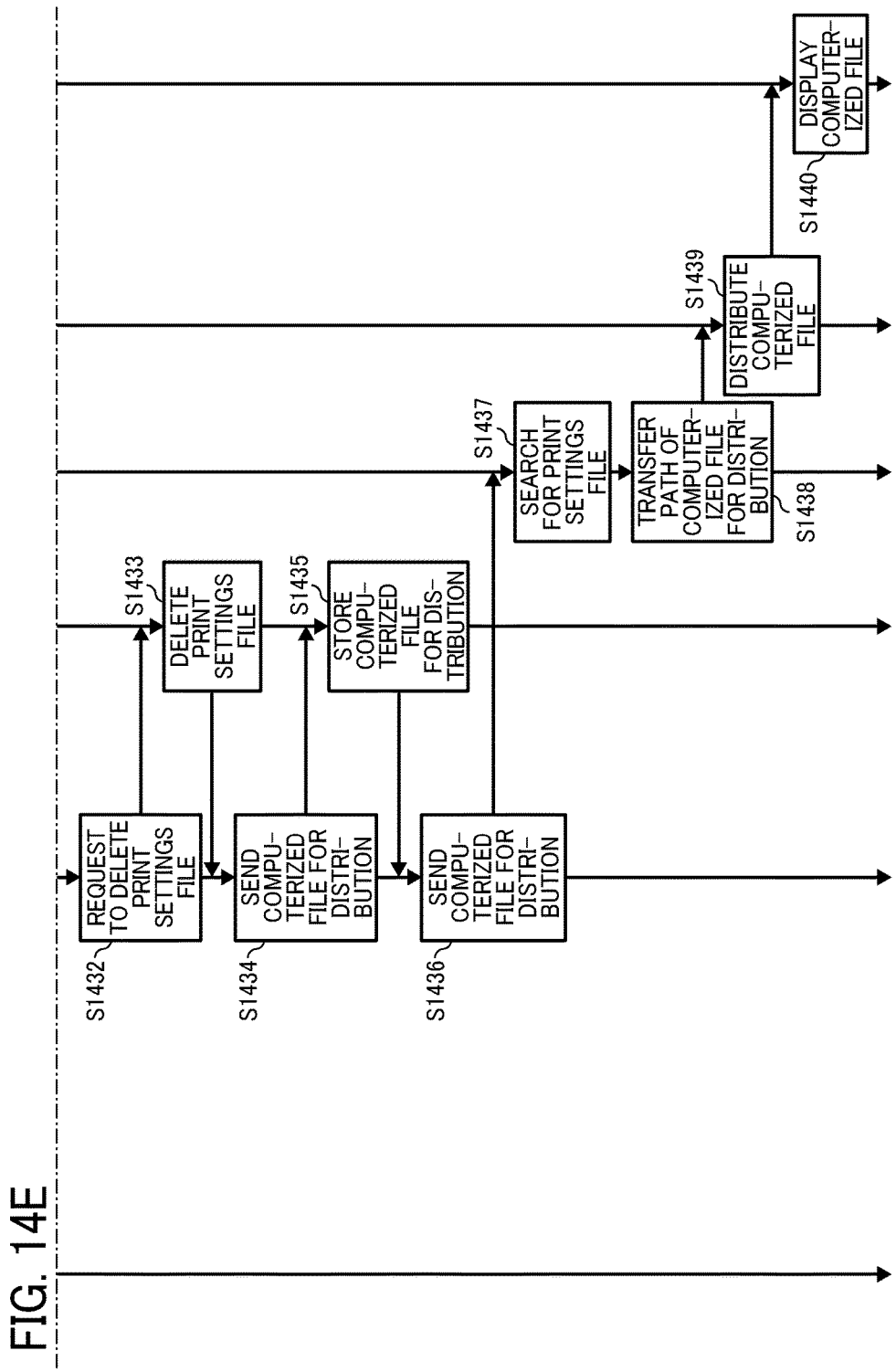
Figure 15D:
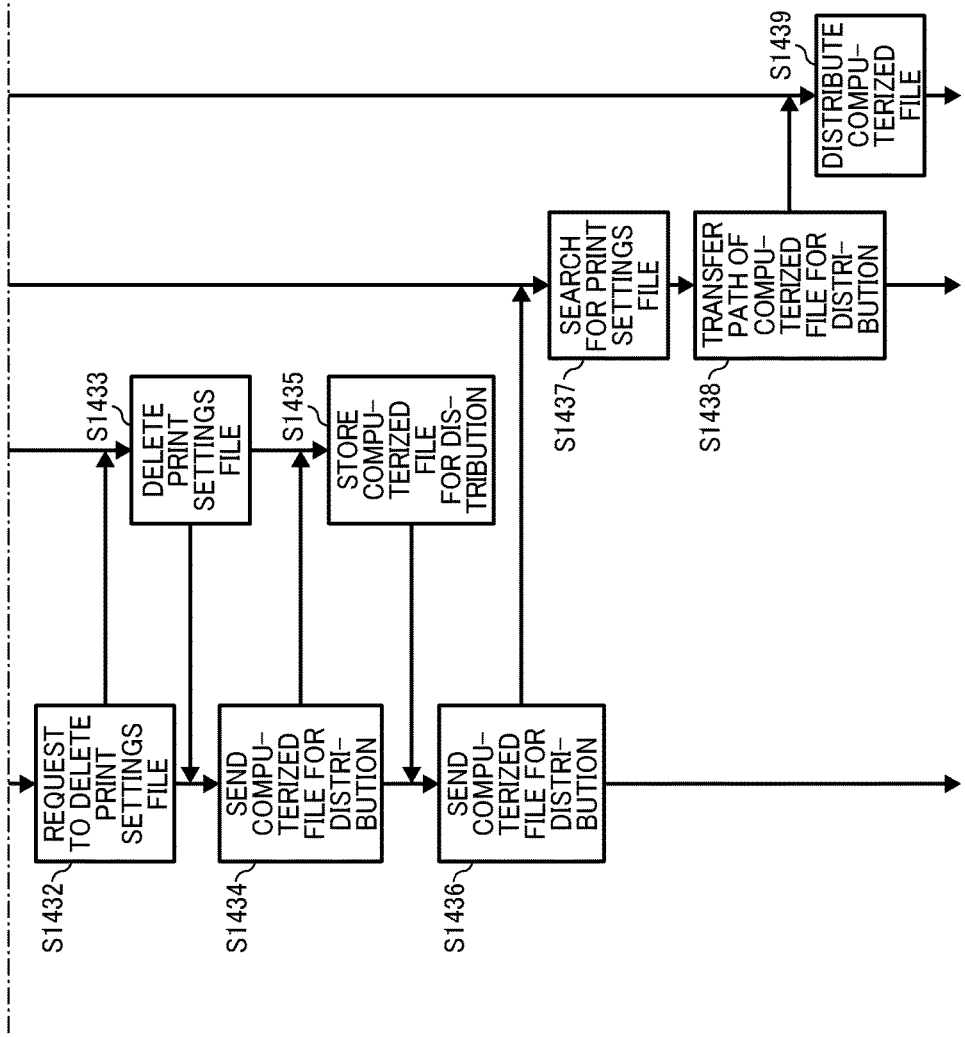

The drawing unit 112 performs the operation of checking whether or not printing is performed for the first time by specifying the folder that includes the master computerized file for reprinting and checking whether or not the print setting file exists in the specified folder. As a result, in this case, the drawing unit 112 functions as an image data specification unit. It should be noted that the operation in steps S1425 to S1430 is the same as illustrated in FIG. 14D. Therefore, redundant descriptions are omitted.

In this case, in checking whether or not printing is performed for the first time, the print setting file saved in S1510 is included in the folder that includes the master computerized file for reprinting. The drawing unit 112 transfers the print setting file stored in the folder to the reprint application 140 in S1515. The reprint application transfers a request to perform printing to create the reprint computerized file based on the print setting file and the master computerized file in the folder to the drawing unit 112 in S1516. After receiving the request to perform printing, the drawing unit 112 performs the same operation after S1431 in FIG. 14D, so redundant descriptions are omitted. It should be noted that the drawing unit 112 functions as a third image data generator in creating the reprint computerized file.

In the information distribution system in this embodiment, as described above, it is possible to modify print settings using the external terminal 6 and create a computerized file again. If the viewer 63 is started and the reprint computerized file is displayed on the LCD 60 of the external terminal 6, by performing an operation of printing the computerized file for distribution again on the screen by user operation, it is possible to modify the print settings. In this case, it is possible that the print setting file includes the document ID, and it is possible to specify the print setting file by performing searching based on the document ID.

As described above, in the information distribution system in this embodiment, the master computerized file is created by applying print settings with the highest image quality to data such as the document and image etc. created by applications that creates documents and images. Accordingly, the master computerized file is used as an image file to be edited, and the file for distribution distributed to the external terminal is created.

In addition, in this embodiment, it is possible to specify the master computerized file from the external terminal 6. As a result, it is possible to create the image file again by applying print settings configured for the reprint computerized file distributed to the external terminal 6 to the master computerized file. In this case, the distribution controller 130 performs an operation of acquiring a second image processing setting that acquires settings of processing an image transferred by the external terminal 6. Consequently, in the information distribution system in this embodiment, without data such as a document and image etc. created by applications as a file to be printed originally, it is possible to recreate a computerized file computerizing data such as the document and image created by the applications.

In the embodiments described above, an information processing apparatus that may recreate a computerized file without a source file of the computerized file is provided.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, workstation) may control an information processing apparatus or an image processing apparatus such as image forming apparatus using a computer-readable program, which can execute the above-described processes or steps. In the above-described embodiments, at least one or more of the units of apparatus can be implemented as hardware or as a combination of hardware/software combination. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A non-transitory computer-readable recording medium storing computer readable instructions that, when executed by one or more processors of an information processing apparatus, causes the processor to implement an information processing method comprising:
   accepting a configured print setting for generating image data from a file creating application;
   generating identification information for identifying the image data;
   generating first image data based on a first print setting different from the configured print setting from the file creating application, the first print setting corresponding to highest image quality print settings of a printer driver of the information processing apparatus;
   storing, in a memory included in the information processing apparatus, the identification information of the image data and the first image data associated with each other;
   generating second image data for distribution to at least one external terminal, the generating including applying the configured print setting from the file creating application to the first image data, the second image data including the identification information of the image data;
   receiving a second print setting configured for the second image data and the identification information of the image data included in the second image data, the second print setting received from the at least one external terminal and being different from the first print setting;
   specifying the first image data based on the identification information of the image data included in the second image data;
   generating third image data by applying the second print setting configured for the second image data to the specified first image data; and
   transmitting the generated third image data to the at least one external terminal for printing or displaying by the at least one external terminal.

2. The non-transitory computer-readable recording medium of claim 1, wherein the method further includes:
   when the configured print setting corresponds to the second print setting configured for the second image data, the first print setting causes the second image data and the third image data be the same image data.

3. The non-transitory computer-readable recording medium of claim 1, wherein the method further includes:
   transferring the second image data to the at least one external terminal, wherein the receiving includes receiving the second print setting configured for the second image data and the identification information included in the second image data from a viewer application of the at least one external terminal.

4. The non-transitory computer-readable recording medium of claim 3, wherein the method further includes:
   determining whether the second print setting is stored in the memory of the information processing apparatus; and
   when the determining determines that the second print setting is not stored in the information processing apparatus, the transferring the second image data to the at least one external terminal is performed.

5. The non-transitory computer-readable recording medium of claim 3, wherein the method further includes:
   transferring the third image data to the at least one external terminal;
   receiving a third print setting configured for the third image data from the at least one external terminal; and
   generating, fourth image data by applying the second print setting configured for the second image data to the specified first image data, the fourth image data being different from the second image data and the third image data by applying the third print setting configured for the received third image data to the specified first image data.

6. The non-transitory computer-readable recording medium of claim 1, wherein the at least one external terminal is at least one of:
   a server, a smart device, and a multi-function printer.

7. The non-transitory computer-readable recording medium of claim 6, wherein
   the image data and the first image are generated to be file compatible with the information processing apparatus; and
   the second image data and the third image data are generated to be file compatible with the at least one external terminal.

8. The non-transitory computer-readable recording medium of claim 1, wherein the information processing apparatus and the at least one external terminal are connected via a connection plug-in.

9. The non-transitory computer-readable recording medium of claim 8, wherein the information processing apparatus and the at least one external terminal are connected to a conference system via the connection plug-in.

10. An information processing apparatus, comprising:
   a memory having computer readable instructions stored thereon; and
   at least one processor configured to execute the computer readable instructions to,
      accept a configured print setting for generating image data from a file creating application;
      generate identification information for identifying the image data;
      generate first image data based on a first print setting different from the configured print setting from the file creating application, the first print setting corresponding to highest image quality print settings of a printer driver of the information processing apparatus;

store, in the memory, the identification information of the image data and the first image data associated with each other;

generate second image data for distribution to at least one external terminal, the generating including applying the configured print setting from the file creating application to the first image data, the second image data including the identification information of the image data;

receive a second print setting configured for the second image data and the identification information of the image data included in the second image data, the second print setting received from the at least one external terminal and being different from the first print setting;

specify the first image data based on the identification information of the image data included in the second image data;

generate third image data by applying the second print setting configured for the second image data to the specified first image data; and transmit the generated third image data to the at least one external terminal for printing or displaying by the at least one external terminal.

11. An information processing method, the method comprising:

accepting, using at least one processor of an information processing apparatus, a configured print setting for generating image data from a file creating application;

generating, using the at least one processor, identification information for identifying the image data;

generating, using the at least one processor, first image data based on a first print setting different from the configured print setting from the file creating application, the first print setting corresponding to highest image quality print settings of a printer driver of the information processing apparatus;

storing, using the at least one processor, in a memory included in the information processing apparatus, the identification information of the image data and the first image data associated with each other;

generating, using the at least one processor, second image data for distribution to at least one external terminal, the generating including applying the configured print setting from the file creating application to the first image data, the second image data including the identification information of the image data;

receiving, using the at least one processor, a second print setting configured for the second image data and the identification information of the image data included in the second image data, the second print setting received from the at least one external terminal and being different from the first print setting;

specifying, using the at least one processor, the first image data based on the identification information of the image data included in the second image data;

generating, using the at least one processor, third image data by applying the second print setting configured for the second image data to the specified first image data; and transmitting, using the at least one processor, the generated third image data to the at least one external terminal for printing or displaying by the at least one external terminal.

* * * * *